R. SPEIR & J. MATHER.
Apparatus for Condensing Vapors, Gases, &c.
No. 168,060. Patented Sept. 21, 1875.
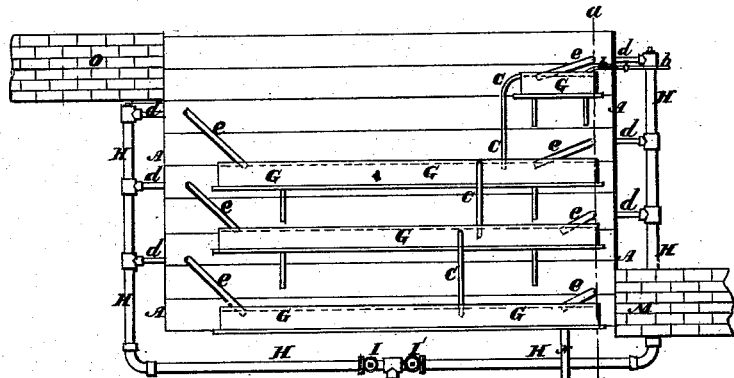
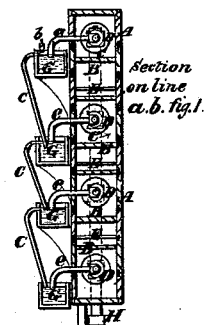

UNITED STATES PATENT OFFICE.

ROBERT SPEIR, OF GREENOCK, AND JOHN MATHER, OF GATESHEAD-ON-TYNE, NORTH BRITAIN.

IMPROVEMENT IN APPARATUS FOR CONDENSING VAPORS, GASES, &c.

Specification forming part of Letters Patent No. 168,060, dated September 21, 1875; application filed July 15, 1875.

*To all whom it may concern:*

Be it known that we, ROBERT SPEIR, of Greenock, in the county of Renfrew, North Britain, chemist, and JOHN MATHER, of Gateshead-on-Tyne, in the county of Durham, North Britain, engineer, have invented new or improved apparatus, which may be used for condensing vapors or gases, for heating liquids, for purifying and bleaching oils and gases, and for analogous purposes, of which the following is a specification:

This invention, which relates to new or improved arrangements of apparatus applicable to the condensing of steam, vapors, smoke, acids, and of fumes generally, to the heating of feed-water for steam-boilers, or for other purposes in which heated water is required, to the purification of oils and gases, as well as for other uses in which apparatus available for these purposes may be employed, consists of a chamber, in which the condensing or other operation is effected by a spray produced by a blast of compressed atmospheric air or steam. The chamber, which is preferably made rectangular, is, under one modification of our said invention, provided vertically with a number of shelves, inclined in opposite directions from each end of the chamber, and terminated alternately at a short distance from these ends, thus forming a tortuous or winding passage through the apparatus. The blast of atmospheric air or steam is passed in between the shelves, and, forming a partial vacuum, creates a draft through the chamber. To the pipes through which the compressed air or steam is conducted to the chamber branch pipes are attached, which communicate with tanks or vessels containing liquid, which liquid is drawn up from the tanks or vessels by the draft, and forced by the air or steam jet, in the form of spray, into the spaces between the shelves. The passage through the chamber is, at one end, connected to the pipe, flue, or apparatus containing the gases or bodies to be treated, and at its other end the passage is connected with a chimney.

Under another modification of our said invention the chamber, in lieu of being divided vertically by shelves, as hereinbefore set forth, is divided horizontally by a series of parallel partitions, extending from top to bottom of the chamber, and terminating alternately a short distance from each end.

On the sheet of drawings hereunto appended, Figure 1 is a side elevation, and Fig. 2 a longitudinal section, of one form of the apparatus constructed in accordance with our said invention. Fig. 3 is a transverse section of the apparatus on the line *a b*, Fig. 1, while Fig. 4 is a similar section on the line *c d*, Fig. 2.

As shown by these figures the apparatus consists of a rectangular chamber, A, divided into compartments by the inclined shelves or partitions B, which alternately terminate at a short distance from opposite ends of the chamber A, in such a manner as to form a winding or tortuous passage through the interior of the chamber. At the end of each shelf or partition B, which terminate a short distance from the end of the chamber A, a block, C, extending across the entire width of the chamber, is placed between the terminated shelf and the one situate above it, and in each such block a tapered or trumpet-shaped hole or opening, D, is made, as shown more particularly at Fig. 2. At the end of each compartment of the chamber A, opposite to the block C, a baffle-plate, E, is placed to contract the exit from the compartment, and at the upper sides of these baffle-plates, which are preferably laid at an angle, an opening, *a*, is made, communicating with the chamber above.

At one side of the chamber A tanks or vessels G are placed, into which water or other liquid is conducted through the pipe *b*, a constant and equal level in all the tanks being maintained by providing the upper tanks with overflow-pipes *c*, as shown more particularly at Fig. 3; or ball-cocks or their equivalents may be employed for that purpose. The air or steam for producing the spray is conducted to each end of the apparatus by pipes H, provided with cocks H', and communicating with a pipe, J, which, when compressed air is employed, is attached to an air-pump or other air-compressing apparatus, such as Korting's air-compressor, and, when steam is used, to a steam-boiler. To the pipes H branches $d$ are attached, which extend into the holes or openings D, made in the blocks C, and to a nozzle formed at the inner end of each such branch a pipe, $e$, communicating with one of the tanks or vessels G, is attached. The tanks or vessels are preferably placed at a lower level than the pipes $d$, with which the pipes $e$ communicate.

Fig. 5 of the appended drawings is a section of the nozzle and pipes $d$, and $e$, and, as shown thereon, the compressed-air or steam pipe $d$ has a slight lead over the orifice of the pipe $e$, through which the liquid is drawn upward. The air or steam passing under pressure through the nozzle produces a partial vacuum at K, Fig. 5, which has the effect of causing the water or other liquid to ascend the pipe $e$ to the nozzle, where, being acted upon by the blast, it is atomized or divided into a spray, whose density is regulated by the pressure of the blast, the spray becoming finer or heavier according as the blast-pressure is increased or diminished. From the nozzle the spray is blown into each compartment of the chamber A, as indicated at Fig. 2 of the drawings. The lower ends of the pipes $e$ are preferably only partially immersed in the water or other liquid contained in the tanks or vessels G, as it is found in practice that placing the pipes $e$ in such a manner as to allow them to draw up air along with the water or other liquid enables the blast to effect a better disintegration of the liquid. In lieu of employing a single pipe, $e$, to supply the water or other liquid for the spray produced in each compartment of the chamber A, a series of pipes may be used, in which case they are preferably placed within a large pipe, and are or may be completely immersed in the liquid at their lower ends. In passing the compressed air or steam into the apparatus the cock I' is opened to a fuller extent than the cock I, on account of the greater number of nozzles placed at the end of the chamber A, with which the said cock communicates.

In operating with the apparatus shown at Figs. 1, 2, 3, and 4 of the drawings, the steam, vapor, smoke, fumes, or other gases or bodies to be condensed or treated, are conducted from the pipe, flue, or apparatus containing them into the chamber through the opening at M, and these gases or bodies are drawn into and through the chamber by the current of air or steam.

For the purpose of more complete illustration let it be supposed that the apparatus is employed in the condensation of steam, cold water being filled into the tanks or vessels G. The steam drawn into the chamber A by the blast is first acted upon by the spray of cold water produced, as hereinbefore described, in passing along the lowest compartment of the said chamber, and on reaching the baffle-plate E at the further end of the said compartment, and against which the spray strikes, the water condensed by the said first action of the spray is deflected onto the inclined bottom of the chamber, on which it flows downward to the exit-pipe N, while the uncondensed steam passes into the second compartment, and is therein similarly acted upon by another spray, the products of condensation passing into the lowest compartment through the opening $a$, and so on throughout the entire height of the chamber A. The pipe N communicates with a tank or receiver, from whence the heated waste may be injected into a boiler for raising steam, or it may be conducted away and employed for other purposes.

In adapting the apparatus for condensing, purifying, washing, or otherwise treating smoke, either steam or air may be employed to produce the blast, and the spray may either be formed from water or other suitable liquid. In so employing the apparatus, and in using it for treating fumes, gases, and for other analogous purposes, the upper compartment of the chamber A, which communicates with the flue or chimney O, is preferably made level, and without communication with the chambers beneath otherwise than through the hole or opening D—that is to say, without an opening or passage in the bottom of the chamber, though such an opening may be provided, if desired, and an extra quantity of spray is or may be injected into the said compartment to wash out any remaining trace of gas, the washings being either allowed to escape, to be collected in a separate tank, or to become concentrated by being employed to form the spray during succeeding operations, while the washings from the chambers beneath are collected in the tank or receptacle communicating with the pipe N, and may subsequently be similarly concentrated, if desired.

Besides the application of the apparatus hereinbefore referred to—namely, as a condenser for steam, as a feed-water heater, and for condensing, washing, or purifying smoke and fumes—the apparatus is also specially applicable for the following purposes:

First. As a purifier of oil, tallow, lard, or grease, by subjecting the same to the action of a gaseous bleaching agent conducted through the pipe H. In employment for these purposes, the substance, in a liquid or molten state, is placed in the tanks or vessels G, and drawn therefrom by the action of the blast, and after traveling through the series of compartments it is collected at the drip-pipe N; or, if the substance being treated naturally thickens or crystallizes, it may be drawn at intervals through openings formed in the sides or ends of the chamber A.

Secondly. The apparatus may be employed in oxidizing the red liquor from black ash, by making a spray of it and connecting the flue M to a carbonating-furnace.

Thirdly. It may be used as a denitrating apparatus, in connection with sulphuric-acid chambers, by making a spray of the acid, instead of passing it through "Glover's towers."

Fourthly. As a condenser for hydrochloric acid, instead of condensing-towers.

Fifthly. As a condenser for lead or copper fumes, or for the condensation of emanations, offensive or otherwise, from metal, smelting, or chemical works, and from manure and other manufactories, and for other similar purposes.

Under some circumstances it may be advantageous to increase the length of passage through the chamber A, and at such times diaphragms or plates, alternately terminating a short distance from the upper and lower sides of the shelves, may be placed between one or more pairs of the shelves or partitions B. Coke or other porous matter, such as pumice-stone, may also be placed between the shelves to increase the condensing-surface.

Fig. 6 on the accompanying drawings is a horizontal section; Fig. 7, a longitudinal section on the line $ef$, Fig. 6; and Figs. 8 and 9, transverse sections on the lines $gh$ and $ik$, respectively, of a modified arrangement of the apparatus hereinbefore described, and in which the compartments of the chamber A, in lieu of being placed one above the other, as shown at Figs. 2, 3, and 4, are placed in parallel rows across the chamber. This arrangement of the apparatus is specially adapted for condensing hydrochloric and other acids, and for concentrating the same, if desired. B are the blocks closing one end of each compartment of the chamber, which are provided with tapered or trumpet-shaped openings C for the passage of the gas or vapor through the apparatus. These holes or openings in this, as well as in the arrangement of chamber first described, besides serving to diminish the passage at the ends of the compartments, and so concentrate the gases at the point where they are first acted upon by the spray in each compartment, also serve to prevent the condensed acid flowing into the first and lowest compartment when it is desired to obtain acids of different strengths. This is effected by closing the passages $a$, communicating in both arrangements between the several compartments. The contracted openings in the blocks also serve to prevent back draft through the apparatus. D are the tanks in which is placed the water for producing the spray or the weak acid to be concentrated by being made into a spray, and in such condition employed to condense further portions of gas or vapor in the compartments of the apparatus. The water or acid is drawn up from the tanks D through pipes E by a blast of compressed air or steam conducted through pipes F, in the manner hereinbefore described.

In lieu of placing the tank $D^1$ in the position shown in full lines at Figs. 6 and 9, it may be situated in the position shown in dotted lines at Fig. 9.

G is a damper or trap, placed in the entrance to the chimney or flue to prevent the acid liquid from passing thereinto, such liquid being conducted into the tank $D^2$ by the pipe $m$, Figs. 6 and 8. As the gas or vapor passes through the apparatus in the direction of the arrows it is gradually diminished in temperature and density, so that it is advantageous to decrease the capacity of the chambers in the direction of the flue or chimney, as shown on the drawings, and in the last chamber a heavier or denser spray is preferably employed, so as to condense the last traces of acid, the product of condensation being conducted into the tank $D^2$ through the pipe $m$, as hereinbefore set forth.

It is to be understood that the acid from other compartments may also be conducted into the tanks by providing pipes in such compartments similar to the pipe $m$; and it is further to be understood that we do not confine ourselves to arrange the apparatus precisely in the manner described, and illustrated under two modifications on the appended drawings, as such apparatus may, for special purposes, be considerably modified without departing from the essential features of our said invention.

We claim—

The apparatus herein described, consisting of the shelves B, blocks C, provided with tapered openings D, baffle-plates F, pipes H, $d$, and $e$, and tanks G, all combined and operating together as described.

In witness whereof we have signed our names to this specification in the presence of two subscribing witnesses.

ROBERT SPEIR. [L. S.]
JOHN MATHER. [L. S.]

Witnesses:
GEORGE MACAULAY CRUIKSHANK,
JOHN MACNISH.